(12) United States Patent
Amirkhany et al.

(10) Patent No.: US 12,147,367 B2
(45) Date of Patent: Nov. 19, 2024

(54) FOLDED MEMORY MODULES

(71) Applicant: Rambus Inc., San Jose, CA (US)

(72) Inventors: Amir Amirkhany, Sunnyvale, CA (US); Suresh Rajan, San Jose, CA (US); Ravindranath Kollipara, Palo Alto, CA (US); Ian Shaeffer, Los Gatos, CA (US); David A. Secker, San Jose, CA (US)

(73) Assignee: RAMBUS INC., San Jose, CA (US)

( * ) Notice: Subject to any disclaimer, the term of this patent is extended or adjusted under 35 U.S.C. 154(b) by 0 days.

(21) Appl. No.: 18/355,660

(22) Filed: Jul. 20, 2023

(65) Prior Publication Data

US 2024/0020258 A1   Jan. 18, 2024

Related U.S. Application Data

(63) Continuation of application No. 17/809,688, filed on Jun. 29, 2022, now Pat. No. 11,755,521, which is a continuation of application No. 16/950,861, filed on Nov. 17, 2020, now Pat. No. 11,409,682, which is a continuation of application No. 16/525,315, filed on Jul. 29, 2019, now Pat. No. 10,866,916, which is a continuation of application No. 15/289,785, filed on Oct. 10, 2016, now Pat. No. 10,380,053, which is a continuation of application No. 14/182,986, filed on Feb. 18, 2014, now Pat. No. 9,489,323.

(60) Provisional application No. 61/767,097, filed on Feb. 20, 2013.

(51) Int. Cl.
*G06F 13/40* (2006.01)
*G06F 12/00* (2006.01)
*G06F 13/00* (2006.01)
*G06F 13/16* (2006.01)

(52) U.S. Cl.
CPC .......... *G06F 13/4022* (2013.01); *G06F 12/00* (2013.01); *G06F 13/00* (2013.01); *G06F 13/1673* (2013.01); *G06F 13/1694* (2013.01)

(58) Field of Classification Search
CPC ...................................................... G06F 12/00
See application file for complete search history.

(56) References Cited

U.S. PATENT DOCUMENTS

| | | |
|---|---|---|
| 5,600,606 A | 2/1997 | Rao |
| 6,034,878 A | 3/2000 | Osaka et al. |
| 6,247,070 B1 | 6/2001 | Ryan |

(Continued)

OTHER PUBLICATIONS

"Memory Rank", <https://en.wikipedia.org/wiki/Memory_rank>, accessed on Dec. 28, 2015. 2 Pages.

(Continued)

*Primary Examiner* — Henry Tsai
*Assistant Examiner* — Aurangzeb Hassan
(74) *Attorney, Agent, or Firm* — AMSEL IP LAW PLLC; Jason Amsel

(57) ABSTRACT

A memory module comprises a data interface including a plurality of data lines and a plurality of configurable switches coupled between the data interface and a data path to one or more memories. The effective width of the memory module can be configured by enabling or disabling different subsets of the configurable switches. The configurable switches may be controlled by manual switches, by a buffer on the memory module, by an external memory controller, or by the memories on the memory module.

20 Claims, 9 Drawing Sheets

(56) References Cited

U.S. PATENT DOCUMENTS

| | | | |
|---|---|---|---|
| 6,820,163 | B1 | 11/2004 | McCall et al. |
| 7,508,723 | B2 | 3/2009 | Goodwin et al. |
| 7,606,042 | B2 | 10/2009 | Goodwin |
| 8,335,894 | B1* | 12/2012 | Rajan ............... G06F 12/0238 711/167 |
| 8,380,943 | B2 | 2/2013 | Shaeffer |
| 8,738,860 | B1* | 5/2014 | Griffin ............... G06F 12/0897 711/122 |
| 8,756,364 | B1 | 6/2014 | Bhakta et al. |
| 9,037,774 | B2 | 5/2015 | Solomon et al. |
| 2001/0052057 | A1 | 12/2001 | Lai et al. |
| 2002/0112119 | A1* | 8/2002 | Halbert ............... G11C 7/1051 711/115 |
| 2002/0129215 | A1 | 9/2002 | Yoo et al. |
| 2002/0161968 | A1 | 10/2002 | Yoo et al. |
| 2003/0076702 | A1 | 4/2003 | Kyung et al. |
| 2004/0186956 | A1 | 9/2004 | Perego et al. |
| 2004/0188704 | A1 | 9/2004 | Halbert et al. |
| 2005/0005053 | A1 | 1/2005 | Jang |
| 2005/0166026 | A1 | 7/2005 | Ware et al. |
| 2006/0161745 | A1 | 7/2006 | Lee et al. |
| 2006/0184702 | A1 | 8/2006 | Yeh |
| 2007/0195613 | A1* | 8/2007 | Rajan ............... G06F 12/00 365/230.03 |
| 2008/0080261 | A1 | 4/2008 | Shaeffer et al. |
| 2008/0126690 | A1* | 5/2008 | Rajan ............... G06F 13/1673 711/E12.001 |
| 2009/0103374 | A1 | 4/2009 | Han et al. |
| 2010/0077267 | A1 | 3/2010 | Perego et al. |
| 2013/0238841 | A1 | 9/2013 | Kim |
| 2014/0040568 | A1 | 2/2014 | Lee et al. |
| 2014/0040569 | A1 | 2/2014 | Solomon et al. |
| 2014/0149631 | A1* | 5/2014 | Kim ............... G06F 13/1689 711/149 |

OTHER PUBLICATIONS

JEDEC Standard No. 21-C, Release 11a, "PC1600/2100 DDR SDRAM Registered DIMM: Design Specification," Oct. 2003, Revision 1.2, 4.20.4-184 PIN, PC1600/2100 DDR SDRAM Registered DIMM Design Specification. 69 pages.

Karabatsos, C., "Quad Band Memory (QBM) Technology", Kentron Technologies, Inc., Apr. 2001. 5 pages.

KENTRON Technologies, Inc., "Quad Band Memory (QBM)," "The 'QBM Enabled' VIA PT880/PM880 Chipset Solutions with the Fastest Memory," published Jul. 21, 2003. 12 pages.

QBM Alliance, Platform Conference, Quad Band Memory: DDR 200/266/333 devices producing DDR400/533/667, Jan. 23-24, 2002. 33 pages.

* cited by examiner

FOLDED MEMORY MODULES

RELATED APPLICATIONS

This application is a continuation of U.S. patent application Ser. No. 17/809,688 filed on Jun. 29, 2022, now U.S. Pat. No. 11,755,521, which is a continuation of U.S. patent application Ser. No. 16/950,861 filed on Nov. 17, 2020, now U.S. Pat. No. 11,409,682, which is a continuation of U.S. patent application Ser. No. 16/525,315 filed on Jul. 29, 2019, now U.S. Pat. No. 10,866,916, which is a continuation of U.S. patent application Ser. No. 15/289,785 filed on Oct. 10, 2016, now U.S. Pat. No. 10,380,053, which is a continuation of U.S. patent application Ser. No. 14/182,986 filed on Feb. 18, 2014, now U.S. Pat. No. 9,489,323, which claims the benefit of U.S. Provisional Application No. 61/767,097 filed on Feb. 20, 2013, the contents of which are each incorporated by reference herein.

BACKGROUND

As memory bus speeds increase, maintaining good signal integrity becomes increasingly difficult. In multi-drop data topologies, multiple memory devices share data signals in order to expand memory capacity without increasing the number of data pins on the memory controller or data lines on the motherboard. However, multi-drop data topologies can degrade signal integrity due to increased loading characteristics, thereby reducing speed at which memory can run.

BRIEF DESCRIPTION OF THE DRAWINGS

The teachings of the embodiments herein can be readily understood by considering the following detailed description in conjunction with the accompanying drawings.

DETAILED DESCRIPTION OF EMBODIMENTS

A multi-module memory system has a folded topology that enables expandable memory with reduced signal degradation compared to conventional multi-drop topologies. In the folded memory topology, each memory module uses only a fraction (e.g., half) of the available data lines, thus reducing loading effects. In a first embodiment, the multi-module memory system can be implemented via a motherboard having a plurality of dedicated memory slots (e.g., even and odd memory slots) for use with a plurality of interchangeable fixed width memory modules (e.g., each using half of the available data lines on the motherboard). In a second embodiment, the multi-module memory system can be implemented using a standard multi-drop motherboard with a plurality of memory modules each configured as a particular memory module type (e.g., an even memory module or an odd memory module). In one embodiment, the memory modules may be hardwired for their particular configuration (e.g., even or odd). Alternatively, the memory modules may be configurable using configurable switches between the data pins and the memories. The configurable switches may be controlled by a manual switch, by a buffer on the memory module, by control pins coupled to an external memory controller, or by a control signal from the memories. These embodiments are described in further detail below with reference to the figures.

Figure 1:
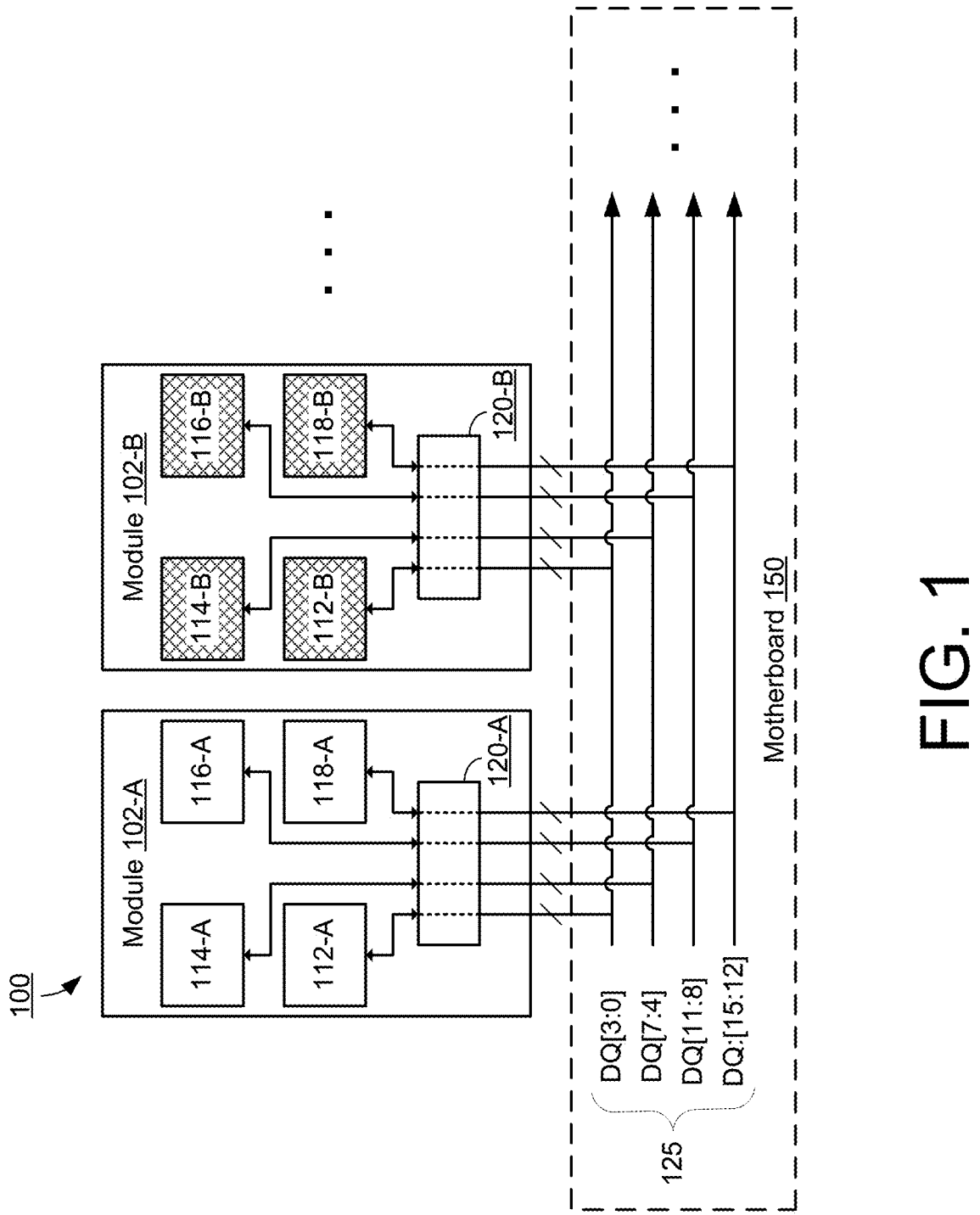
FIG. 1 is an embodiment of a multi-drop motherboard coupled to a plurality of memory modules.

FIG. 1 illustrates an example embodiment of a multi-module memory system 100 having a multi-drop topology. A motherboard 150 includes a plurality of data lines 125 (e.g., grouped into four-bit wide sets of data lines DQ[3:0], DQ[7:4], DQ[11:8], DQ[15:12]) for communicating data between a memory controller (not shown) and a plurality of memory modules 102 (e.g., memory modules 102-A, 102-B, . . . ) via one or more memory slots. Each memory module 102 includes a plurality of memories (e.g., four memories 112, 114, 116, 118) and a microbuffer 120. In one embodiment, the memory modules 102 each comprises a printed circuit board while the individual memories 112, 114, 116, 118 are embodied as integrated circuits mounted to the printed circuit board. Memories 112, 114, 116, 118 may comprise for example dynamic random access memories (DRAMs) or other types of volatile or non-volatile memories. Memories 112, 114, 116, 118 store data received via data lines DQ 125 in response to receiving a write command via the command address signal CA (not shown). Memories 112, 114, 116, 118 output data to data lines DQ 125 in response to receiving a read command via the command address signal CA (not shown).

The microbuffers 120 buffer and route data between data lines 125 and memories 112, 114, 116, 118. For example, in one embodiment, microbuffer 120 provides, for each set of four data lines (e.g., DQ[3:0], DQ[7:4], DQ[11:8], DQ[15:12], a one-to-one routing with one of the memories 112, 114, 116, 118.

The architecture of FIG. 1 is referred to as a multi-drop architecture because each of the data lines 125 is shared between multiple memory modules 102. Each memory module 102 can be separately addressed via a chip select line (not shown) so that the memory controller can individually communicate with a particular memory module 102 over the shared data lines 125. The multi-drop topology of FIG. 1 thus supports memory expansion by allowing multiple memory modules 102 to be connected to common data lines 125. However, multi-drop topologies can degrade signal integrity, reducing the speed at which memory system 100 can operate. Particularly, the maximum memory speeds tend to decrease substantially as the number of memory modules 102 coupled to shared data lines 125 increases, thus resulting in an undesirable tradeoff between performance and expandability.

Figure 2:
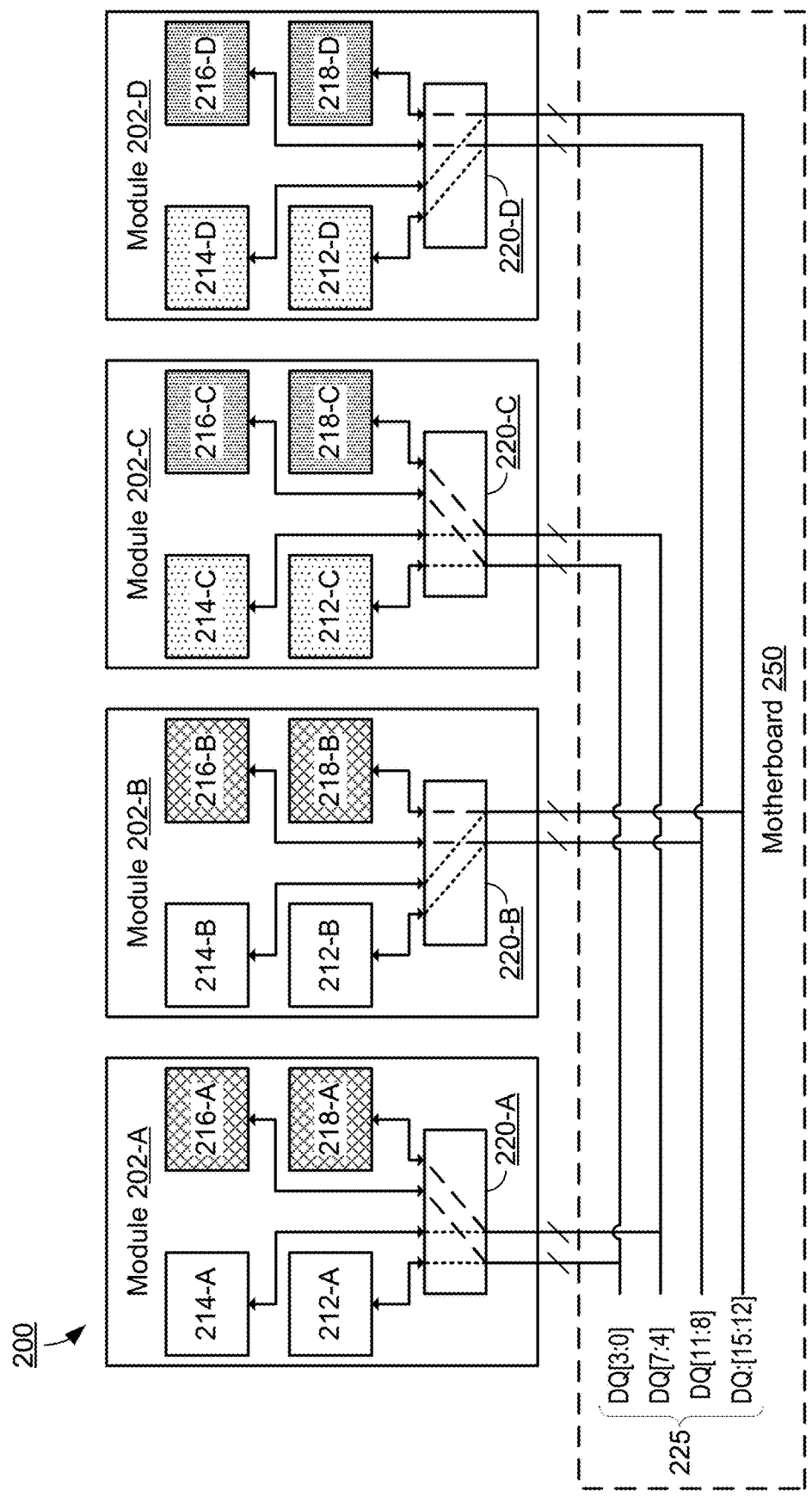
FIG. 2 is a first embodiment of a folded module memory system.

FIG. 2 illustrates an example embodiment of a multi-module memory system 200 having a folded memory module topology. In this example embodiment, a motherboard 250 includes a plurality of data line 225 for communicating data between a memory controller (not shown) and a plurality of memory modules 202, each having a plurality of memories 212, 214, 216, 218, and a microbuffer 220.

In contrast to the multi-drop topology of FIG. 1, data lines 225 on motherboard 250 are laid out such that only a subset of data lines 225 are connected to each memory module 202. For example, memory modules 202 are configured in a half-width configuration in which data lines DQ[3:0] and DQ[7:4] are coupled only to memory modules 202-A, 202-C while data lines DQ[11:8], DQ[15:12] are coupled only to memory modules 202-B, 202-D. In alternative embodiments, a different memory width may be used (e.g., quarter-width, eighth-width, etc.). Furthermore, in alternative embodiments, a different number of memories may be present on each memory module 202. Additionally, in alternative embodiments, a different number of data lines 225 may be used or the data lines may be grouped differently.

Within each memory module 202, individual memories are assigned to different "ranks." Memories that are assigned to the same rank share a common chip select (not shown) and are thus concurrently enabled or disabled. In one embodiment, for example, memories 212-A, 214-A on first memory module 202-A are assigned to a first rank and memories 216-A, 218-A on first memory module 202-A are assigned to a second rank. On second memory module 202-B, memories 212-B, 214-B are assigned to the first rank and memories 216-B, 218-B are assigned to the second rank. In third module 202-C and fourth module 202-D, memories 212-C, 214-C, 212-D, 214-D are assigned to a third rank and memories 216-C, 218-C, 216-D, 218-D are assigned to a fourth rank. This topology, in which ranks are split between two or more different memory modules 202, is referred to herein as a "folded" topology.

Microbuffers 220 buffer and route the data between data lines 225 and memories 212, 214, 216, 218. Microbuffers 220 may route the data to and from different ones of memories 212, 214, 216, 218 depending on which rank is currently selected. For example, referring to memory module 202-A, in a first configuration of the microbuffer 220-A (e.g., when the first rank is selected), microbuffer 220-A routes data between data lines DQ[3:0], DQ[7:4] and memories 212-A, 214-A respectively. In a second configuration (e.g., when the second rank is selected), microbuffer 220-A instead routes data between data lines DQ[3:0], DQ[7:4] and memories 216-A, 218-A respectively. Microbuffers 220 on the remaining memory modules 202 function similarly. In alternative embodiments, microbuffers 220 may route data in a different manner. For example, in one embodiment, microbuffers 220 may provide full crossbar switching, thus enabling routing between any of the data lines 225 and any of the memories in various configurations.

The folded topology of FIG. 2 allows for double the overall memory capacity compared to the multi-drop topology of FIG. 1 without increasing the loading on the data lines 225. Particularly, in the illustrated example, four memory modules 202 are present but each data line 225 is only coupled to two of the memory modules 202. Thus, from a signal integrity standpoint, the loading effects on the data lines 225 will be similar to that of a two-module system, while still providing the memory capacity of a four module system.

Figure 3:
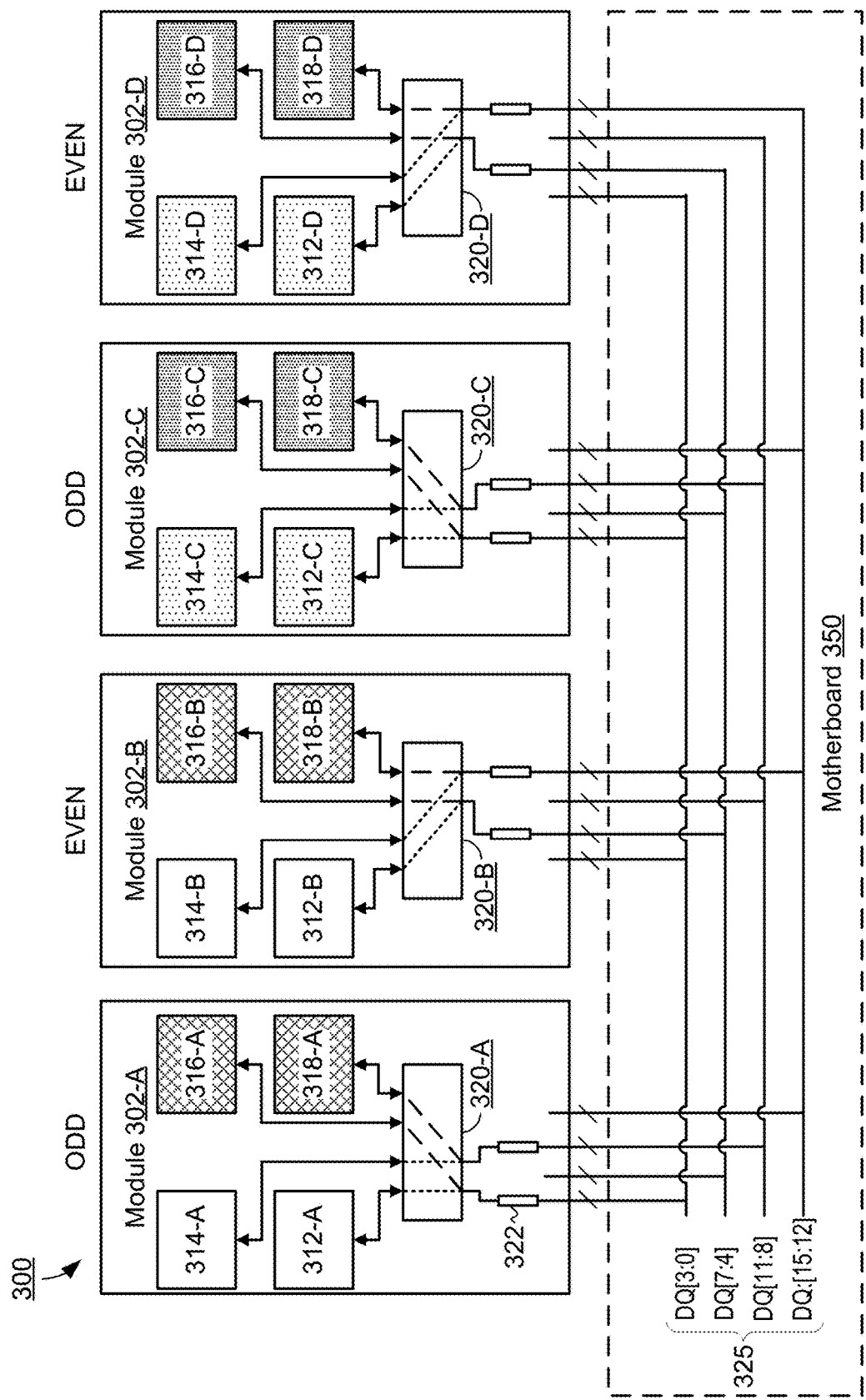
FIG. 3 is a second embodiment of a folded module memory system.

FIG. 3 illustrates another example of a memory system 300 having a folded module topology. In contrast to the memory system 200 of FIG. 2 discussed above, memory system 300 of FIG. 3 does not necessarily alter the multi-drop configuration of motherboard 350 (compared to motherboard 150 of FIG. 1). Thus, each of data lines 325 is configured to be coupled to all of the memory modules 302. However, memory modules 302 are each configured to couple to only a subset of the incoming data lines to memories 312, 314, 316, 318. For example, in the illustrated half-width embodiment, each memory module 302 may be configured as either an "odd" memory module (e.g., memory modules 302-A, 302-C) or an "even" memory module (e.g., memory modules 302-B, 302-D). In odd memory modules 302-A, 302-C, data lines DQ[3:0], DQ[11:8] are coupled to their respective microbuffers 320-A, 320-C (and then to the individual memories 312, 314, 316, 318), while data lines DQ[7:4], DQ[15:12] are left unterminated on odd memory modules 302-A, 302-C. Similarly, in even memory modules 302-B, 302-D, data lines DQ[7:4], DQ[15:12] are coupled to their respective microbuffers 320-B, 320-D (and then to the individual memories 312, 314, 316, 318), while data lines DQ[3:0], DQ[11:8] are left unterminated on even memory modules 302-B, 302-D. In alternative embodiment, different connections can be configured between the motherboard 350 and the memory modules 302. For example, instead of grouping the memory modules as either odd or even modules, the modules may instead be grouped as "lower" modules (configured to communicate with data lines DQ[3:0], DQ[7:4]) and "upper" modules (configured to communicate with data lines DQ[11:8], DQ[15:12]). In other alternative embodiments, memory modules may be configured with different widths or the data lines connecting to each memory module 302 may be grouped differently.

In one embodiment, damping resistors 322 on the memory modules 302 are used to make the connections between data lines 325 and the microbuffer 320, where present. Conveniently, the printed circuit boards for the memory modules 302 can be similarly manufactured for both even and odd modules, and then configured as either an odd memory module or an even memory module simply by adding damping resistors 322 to complete the appropriate connections.

The folded topology of FIG. 3 achieves similar benefits as the folded memory system 200 of FIG. 2, allowing for double the overall memory capacity compared to the multi-drop topology of FIG. 1 without increasing the loading on the data lines (i.e., each data line is still only coupled to two modules 302). Thus, from a signal integrity standpoint, the system 300 electrically reduces to a two module system, while providing the memory capacity of a four module system.

Figure 4:
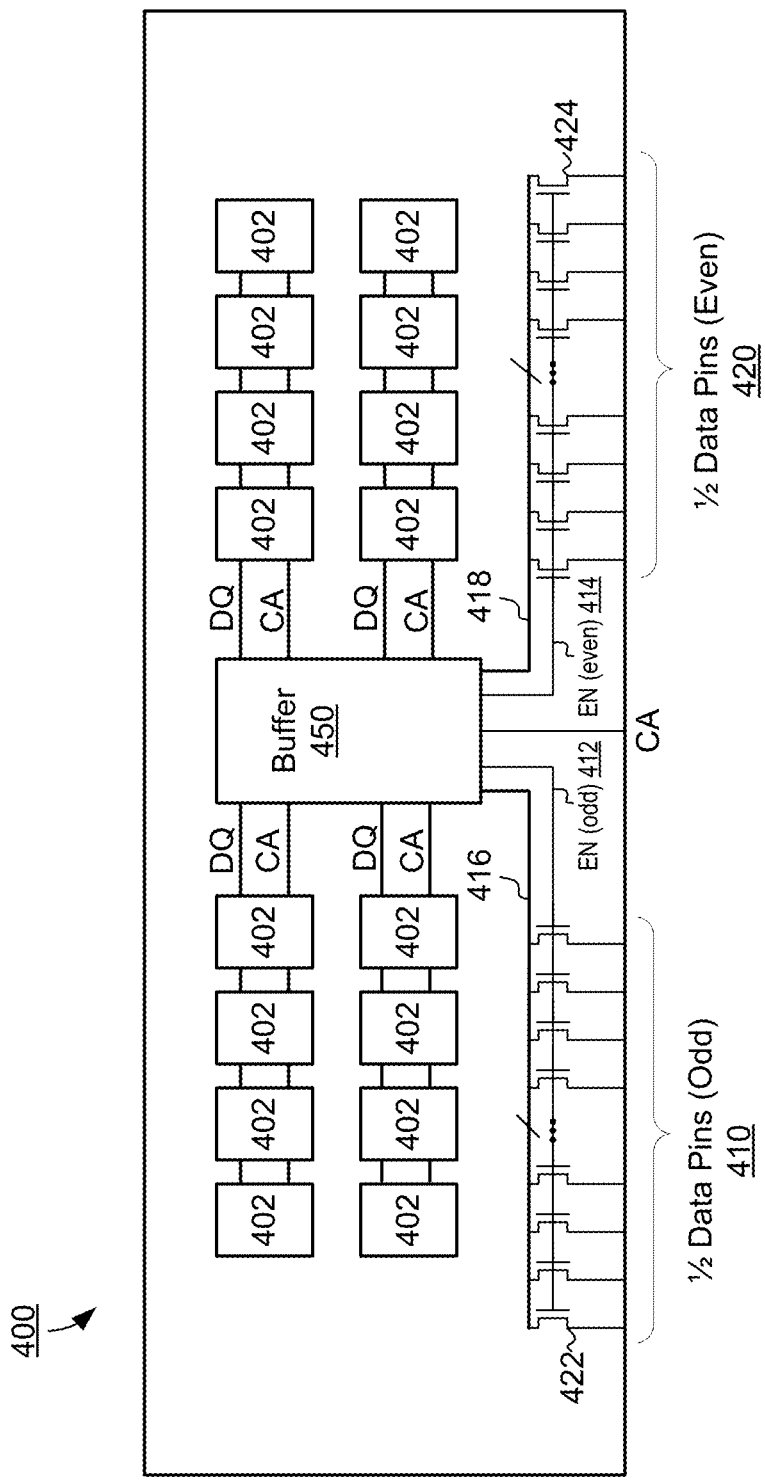
FIG. 4 is an embodiment of a configurable memory module having programmable switches to provide configurable coupling between data lines and memories and centralized data buffer.

FIG. 4 illustrates an embodiment of a configurable memory module 400 for use in a folded module memory system. The configurable memory module 400 comprises a plurality of memories 402 (e.g., 16 memories), a buffer 450, a plurality of configurable switches 422, 424, and a data interface including a plurality of data pins divided into two more subsets (e.g., an odd subset 410 and an even subset 420).

Memories 402 may comprise for example dynamic random access memories (DRAMs) or other types of volatile or non-volatile memories. Memories 402 store data received via memory side data lines DQ in response to receiving a write command via the command address signal CA. Memories 402 output data to memory side data lines DQ in response to receiving a read command via the command address signal CA.

Odd data path 416 comprises a plurality of odd data lines, each of which correspond to one of the odd data pins 410 and communicate data to and from the buffer 450. Programmable switches 422 (e.g., metal oxide semiconductor field effect transistors (MOSFETs)) are coupled in series between each of the odd data pins 410 and odd data path 416. The programmable switches 422 couple the odd data pins 410 to the corresponding data lines of the data path 416 when enabled and decouple the odd data pins 410 from the corresponding data lines of the data path 416 when disabled.

Similarly, an even data path 418 comprises a plurality of even data lines, each of which correspond to one of the even data pins 420 and communicate data to and from the buffer 450. Programmable switches 424 are coupled in series between each of the even data pins 420 and even data path 418. The programmable switches 424 couple the even data pins 420 to the corresponding data lines of the data path 418 when enabled and decouple the even data pins 420 from the corresponding data lines of the data path 418 when disabled.

Buffer 450 buffers the data signals received from the data paths 416, 418 and provides the buffered data signals to appropriate memories 402 via memory side data lines DQ. For example, buffer 450 may route data between a given memory 402 and a subset of odd data lines 416, a subset of even data lines 418, or both. Buffer 450 also receives a command address (CA) input that provides control and addressing information for various memory operations. Buffer 450 buffers the command address signal CA and provides the buffered signal to the appropriate memories 402 via command address lines CA. Buffer 450 furthermore generates odd enable signal 412 and even enable signal 414 to control the odd switches 422 and the even switches 424. Buffer 450 may furthermore provide routing for additional signals (such as, for example chip select signals) that are omitted from the figure for clarity purposes.

By controlling odd switches 422 and even switches 424, buffer 450 can dynamically configure memory module 400 as either an odd memory module (e.g., by enabling odd switches 422 and disabling even switches 424), an even memory module (e.g., by enabling even switches 424 and disabling odd switches 422), or a full-width memory module (e.g., by enabling both odd switches 422 and even switches 424). When configured as an odd memory module, buffer 450 provides data routing to allow communication of data to and from each of the memories 402 using only odd data lines 410. Similarly, when configured as an even memory module, buffer 450 provides data routing to allow communication of data to and from each of the memories 402 using only even data lines 420. In one embodiment, switches 422, 424 may be optimized to provide an appropriate damping resistance, low internal capacitance, and good linearity.

In alternative embodiments, memory module 400 may be configurable using a different scheme for sharing data lines between multiple memories that is not necessarily an even/odd configuration described above. For example, in an alternative embodiment, the memory module 400 can be configured as either a lower memory module (communicating with lower data lines) or an upper memory module (communicating with upper data lines). Furthermore, in other embodiments, the memory module 400 can be configured such that each memory uses a different fraction of the data lines that is not necessarily half (e.g., each memory uses a quarter of the available data lines).

Figure 5:
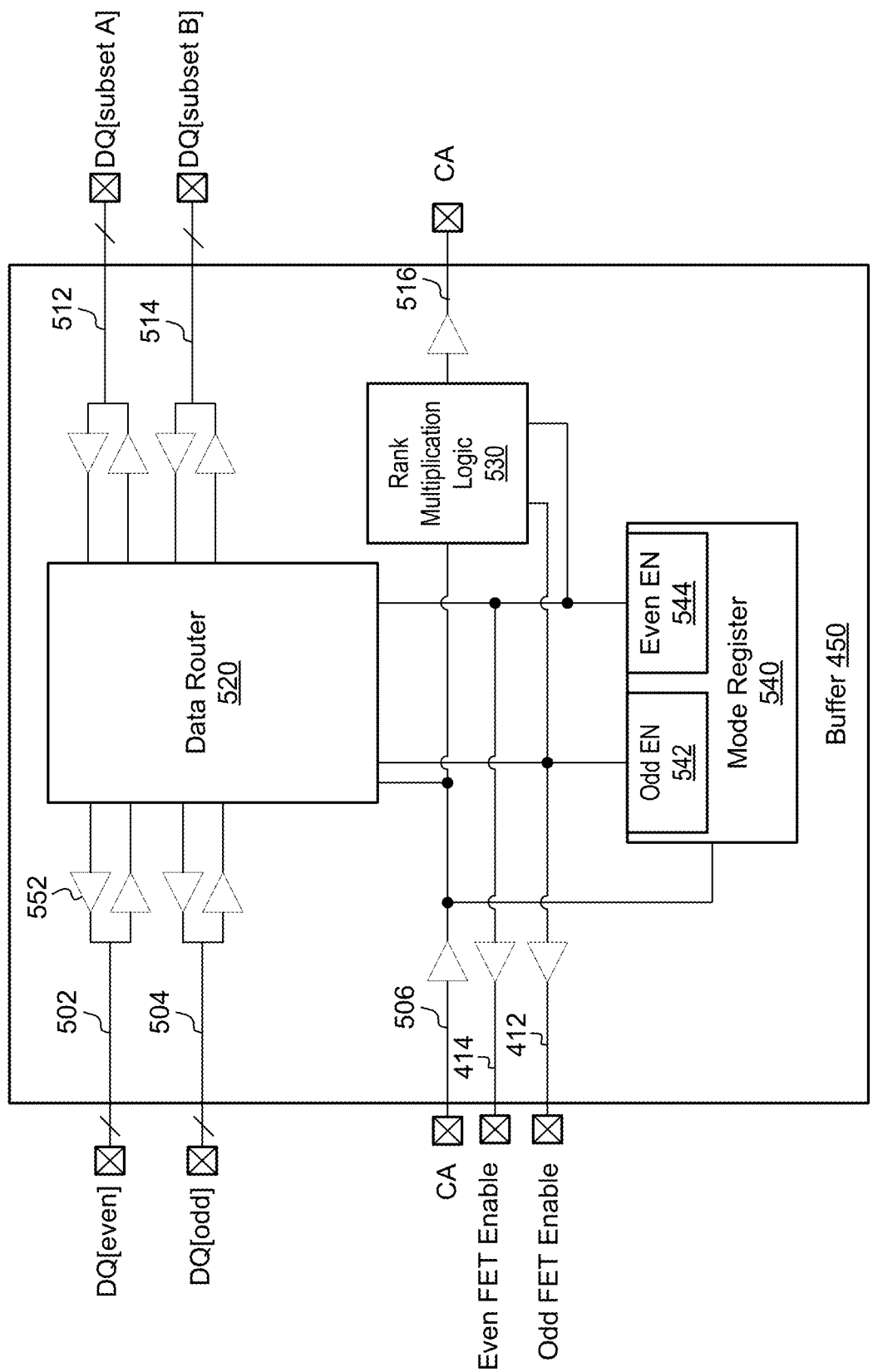
FIG. 5 is an embodiment of a buffer to buffer and route signals on a configurable memory module.

FIG. 5 illustrates an embodiment of a buffer 450 that may be used in a configurable memory module 400. Buffer 450 buffers incoming and outgoing signals via buffers 552 on the input and output signal lines. Buffer 450 furthermore provides data routing and controls the configuration of the memory module 400 via the configurable switches 422, 424.

A data router 520 routes data between controller side data lines 502, 504 and memory side data lines 512, 514 according to the command address signal 506. For example, when configured as an odd memory module, data router 520 routes data between odd data lines 504 and a first subset 512 of the memory side data lines during a first time (e.g., when a first rank is selected), and routes data between odd data lines 504 and a second subset 514 of the memory side data lines during a second time (e.g., when the second rank is selected). Similarly, when configured as an even memory module, data router 520 routes data between even data lines 502 and first subset 512 of the memory side data lines during a first time (e.g., when the first rank is selected), and routes data between even data lines 502 and second subset 514 of the memory side data lines during a second time (e.g., when the second rank is selected). When configured as a full memory module (i.e., both even and odd are enabled), even data lines 502 are passed directly to first subset 512 of the memory side data lines and odd data lines 504 are passed directly to second subset 514 of the memory side data lines.

A mode register 540 stores a mode register value representing the configuration of buffer 450. For example, in one embodiment, mode register 540 comprises an odd enable register 542 and an even enable register 544 that collectively represent the mode register value. The mode register value is output to the configurable switches 422, 424 to enable or disable different subsets of the switches 422, 424. For example, when odd enable register 542 is set, odd enable signal 412 is asserted, thereby enabling odd switches 422. Similarly, when even enable register 544 is asserted, even enable signal 414 is asserted, thereby enabling even switched 424. Data router 520 also reads the odd enable register 542 and the even enable register 544 to determine how to route data between controller side data lines 502, 504 and memory side data lines 512, 514. In one embodiment, mode register 540 can be configured in response to a command sent via the command address signal 506.

Rank multiplication logic 530 receives the command address signal 506 and reads the odd enable register 542 and even enable register 544 to generate command address signal 516 provided to the memories 402. Rank multiplication logic 530 generates appropriate addresses to correctly address memories in different ranks depending on the particular memory configuration.

In alternative embodiments, buffer 450 may implement a different routing scheme to enable different memory configurations that are not necessarily an odd/even configuration as described in the example. For example, in an alternative embodiment, buffer 450 can configure memory module 400 as either a lower memory module (communicating with lower data lines) or an upper memory module (communicating with upper data lines). Furthermore, buffer 450 can configure memory module 400 according to different grouping of data lines that may involve three or more subsets (e.g., each memory uses a quarter of the available data lines).

Figure 6:
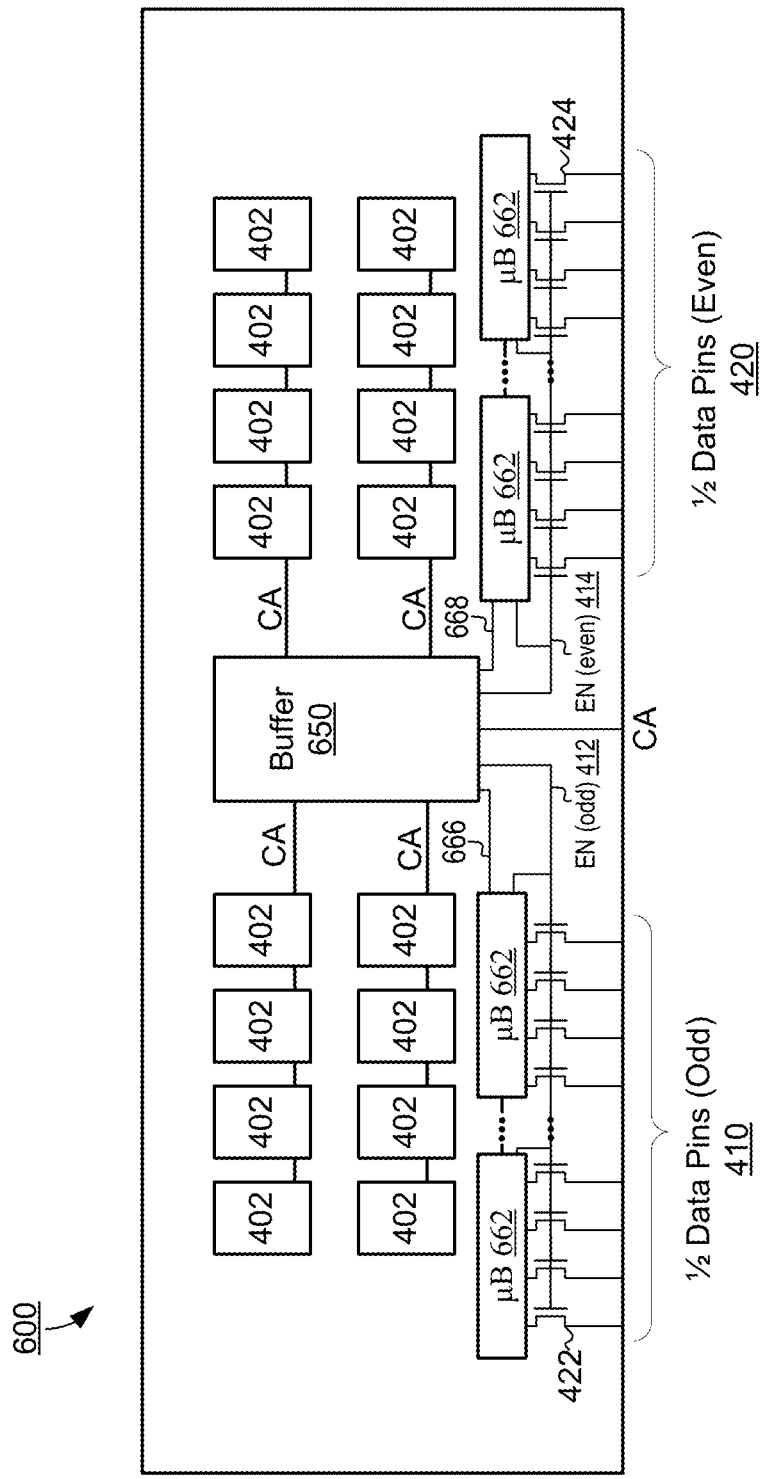
FIG. 6 is an embodiment of a configurable memory module having programmable switches to provide configurable coupling between data lines and memories and distributed microbuffers to provide data buffering and routing.

FIG. 6 illustrates an alternative embodiment of a configurable memory module 600. The memory module 600 is similar to the memory module 400 described above, except that individual distributed microbuffers 662 are included to perform the data routing between data pins 410, 420 and memories 402 in place of the centralized data router 520 described above. For example, a microbuffer 662 is included for each set of four data lines. Each microbuffer 662 routes its respective data to and from appropriate memories via internal data lines (not shown for clarity of illustration) depending on the configuration of the memory. Buffer 650 is similar to buffer 450 described above, but lacks data router 520 because the routing function is instead performed by the distributed microbuffers 662. Buffer 650 provides control signals 666, 668 to control the routing configuration of each microbuffers 662 dependent on the memory configuration.

Figure 7:
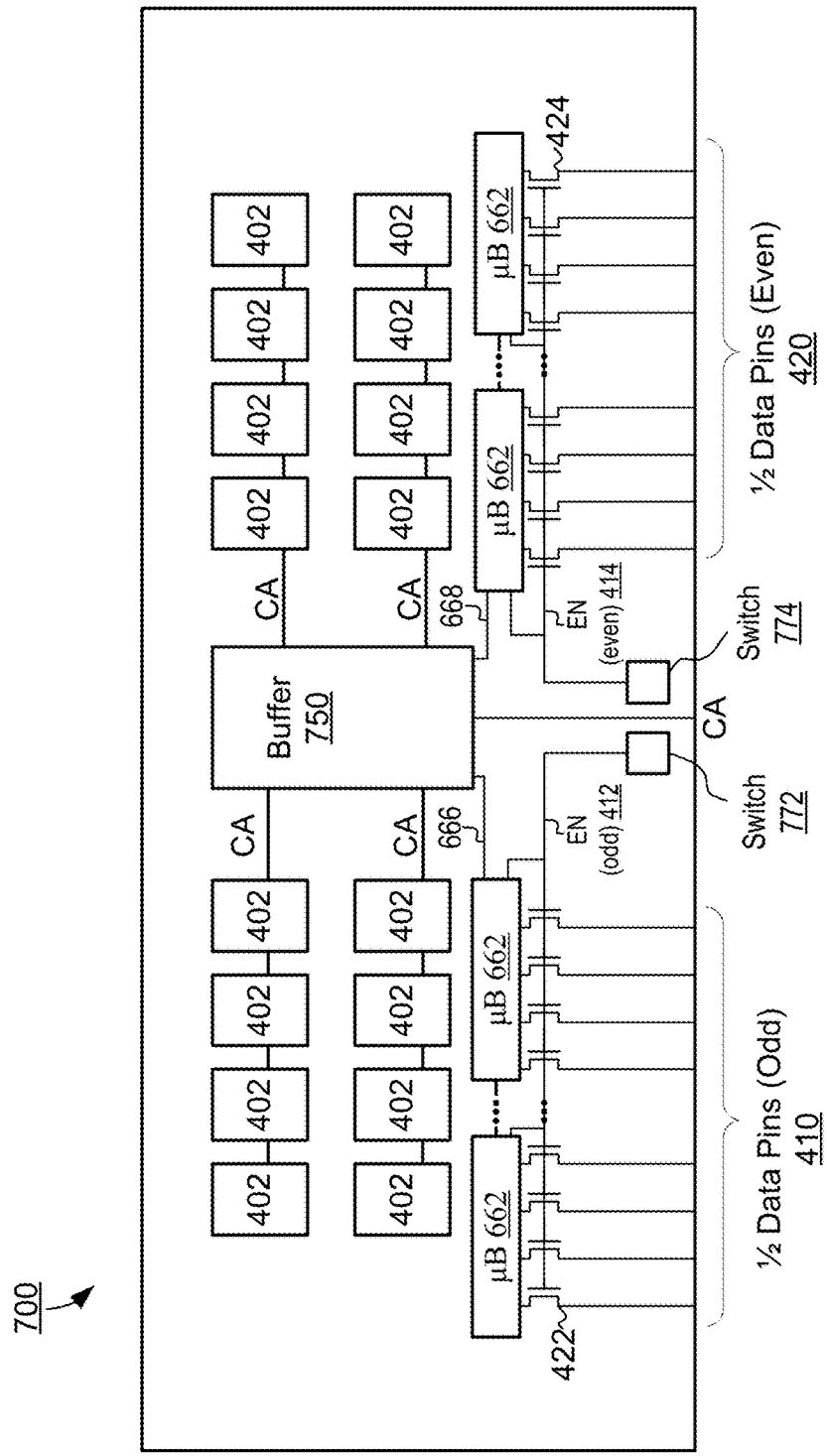
FIG. 7 is an embodiment of a configurable memory module having programmable switches to provide configurable coupling between data lines and memories in which the programmable switches are controlled by manual switches.

FIG. 7 illustrates another alternative embodiment of a configurable memory module 700. The configurable memory module 700 is similar to the configurable memory module 600 described above, except that odd enable signal 412 and even enable signal 414 are generated by manual switches 772, 774 respectively, instead of being controlled by buffer 750. Manual switches 772, 774 may comprise, for example, dual in-line package (DIP) switches or jumper blocks. These switches would enable, for example, the memory module 700 to be manually configured by a system designer as either an odd module, an even module, or a full-width memory module. In alternative embodiments, the manual switches 772, 774 may be located on the motherboard instead of on the memory module 700.

Figure 8:
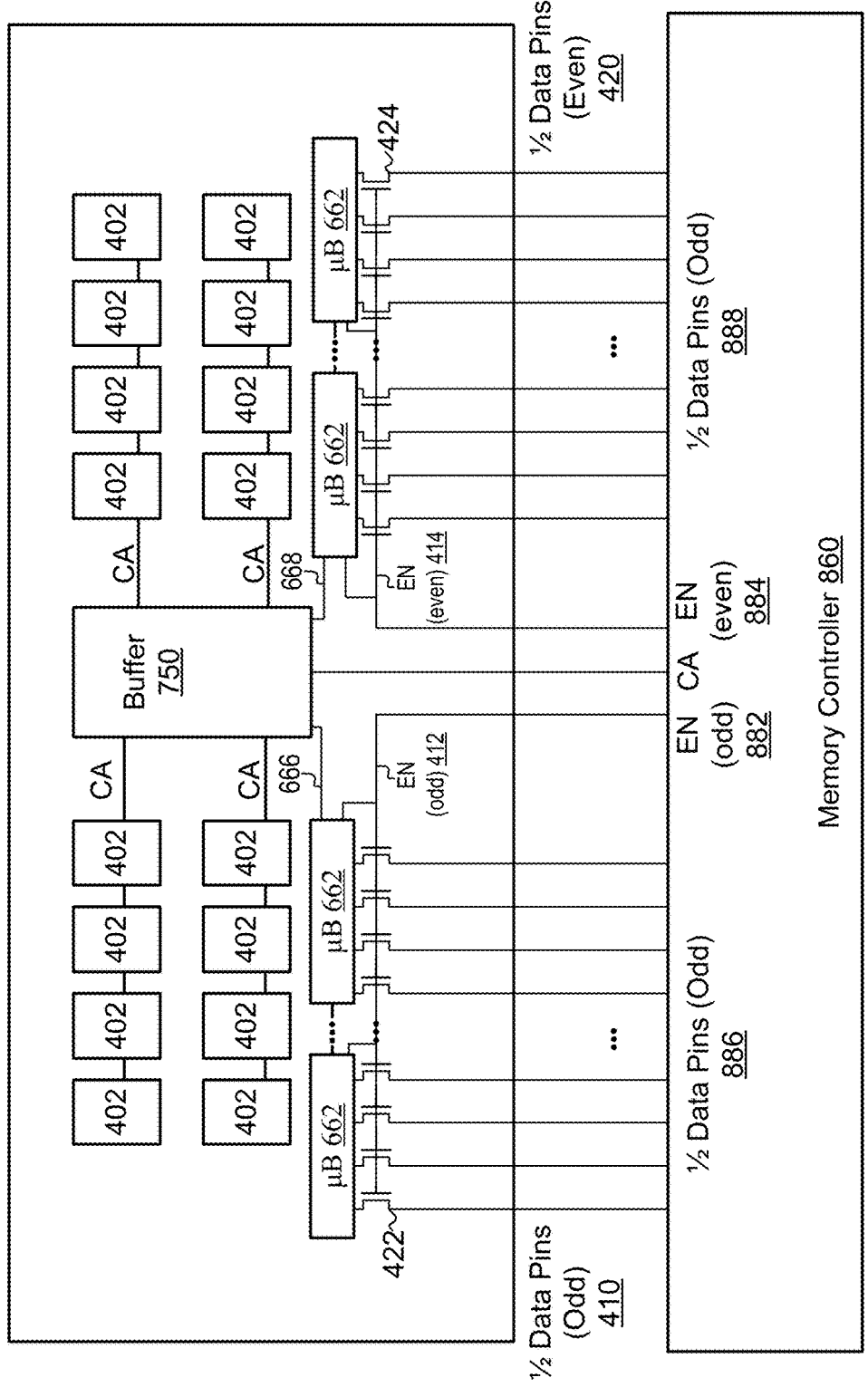
FIG. 8 is an embodiment of a configurable memory module having programmable switches to provide configurable coupling between data lines and memories in which the programmable switches are controlled by an external controller.

FIG. 8 illustrates another alternative embodiment of a configurable memory module 800. The configurable memory module 800 is similar to the configurable memory module 700 described above, except that instead of controlling odd enable signal 412 and even enable signal 414 via the manual switches 772, 774 described above, these enable signals 412, 414 are instead controlled via control signals received on control pins of the memory module 800 from an external memory controller 860.

For example, in one embodiment a memory controller 860 provides commands (via command address signal CA) and data (via data pins 886, 888) to perform memory operations such as read or write operations. Memory controller 860 also includes output pins 882, 884 for providing enable signals 412, 414 to control the configuration of one or more connected memory modules 800. Thus, memory controller 860 can dynamically configure connected memory modules 800 as either odd memory modules, even modules, or full-width memory modules. Alternative embodiments may include a memory controller that can configure memory modules according to different possible configurations discussed above (e.g., lower/upper memory modules, quarter-width configurations, etc.).

Figure 9:
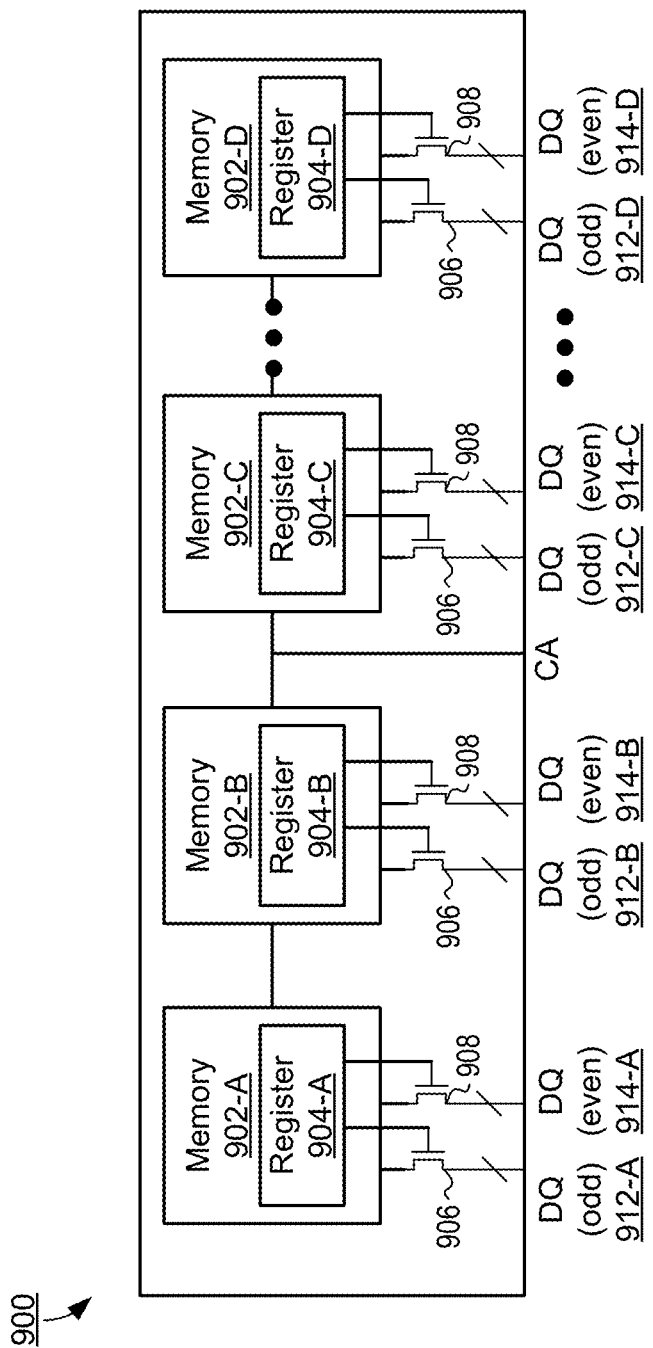
FIG. 9 is an embodiment of a configurable memory module having programmable switches to provide configurable coupling between data lines and memories in which the programmable switches are controlled by the memories.

FIG. 9 illustrates another alternative embodiment of a configurable memory module 900. Memory module 900 applies similar principles as those discussed above, except that the configurability of the module is controlled by the memories. For example, in the illustrated embodiment, a plurality of memories 902 are coupled to a command address signal CA and to two subsets of data lines (e.g., odd data lines 912 and even data lines 914). Different memories 902 may be coupled to different data lines (e.g., odd data lines 912-A are not necessarily the same data lines as odd data lines 912-B). Each memory 902 also includes a mode register 904 that stores a mode register value to control odd switches 906 and even switches 908. Thus, for example, to configure the memory module 900 as an odd memory module, registers 904 enable odd switches 906 and disable even switches 908, thereby causing the memory module 900 to communicate only with odd data lines on the motherboard. Similarly, to configure the memory module 900 as an even memory module, registers 904 enable even switches 908 and disable odd switches 906, thereby causing the memory module 900 to communicate only with even data lines on the motherboard. Memory module 900 may furthermore be configured as a full-width memory module by enabling both odd switches 906 and even switches 908. In one embodiment, the registers 904 can be set responsive to a command sent via the command address signal CA.

Upon reading this disclosure, those of ordinary skill in the art will appreciate still alternative structural and functional designs and processes for a folded memory module. Thus, while particular embodiments and applications of the present disclosure have been illustrated and described, it is to be understood that the disclosure is not limited to the precise construction and components disclosed herein. Various modifications, changes and variations which will be apparent to those skilled in the art may be made in the arrangement, operation and details of the method and apparatus of the present disclosure herein without departing from the scope of the disclosure as defined in the appended claims.

What is claimed is:

1. A memory module comprising:
    a plurality of memory ranks including at least a first memory rank having at least a first memory device and a second memory rank having at least a second memory device;
    a plurality of data pins including at least a first group of data pins and a second group of data pins;
    switching logic to switch data between the first group of data pins and one of the first memory rank and the second memory rank dependent on a select signal, and to switch data between the second group of data pins and one of the first memory rank and the second memory rank dependent on the select signal;
    a first plurality of configurable switches coupled between the first group of data pins and the switching logic controllable to enable or disable a coupling between the first group of data pins and the switching logic;
    a second plurality of configurable switches coupled between the second group of data pins and the switching logic controllable to enable or disable a coupling between the second group of data pins and the switching logic;
    a select line to receive the select signal to control the switching logic; and
    configuration control lines to control the first plurality of configurable switches and the second plurality of configurable switches.

2. The memory module of claim 1, wherein the memory module is configurable between a plurality of selectable data width configurations including at least a first half-width configuration in which the first plurality of configurable switches are enabled and the second plurality of configurable switches are disabled, and a second half-width configuration in which the first plurality of configurable switches are disabled and the second plurality of configurable switches are enabled.

3. The memory module of claim 2, wherein the plurality of selectable data width configurations further includes a full-width configuration in which both the first plurality of configurable switches and the second plurality of configurable switches are enabled.

4. The memory module of claim 1, further comprising:
    one or more mode registers to store one or more mode register values, wherein the one or more mode registers are coupled to the configuration control lines to control enabling and disabling of the first plurality of configurable switches and the second plurality of configurable switches based on the one or more mode register values.

5. The memory module of claim 1, further comprising:
a configuration control interface to receive one or more configuration control signals from a memory controller, the configuration control interface coupled to the configuration control lines to control enabling and disabling of the first plurality of configurable switches and the second plurality of configurable switches based on the one or more configuration control signals.

6. The memory module of claim 1, wherein the switching logic comprises:
a first microbuffer to switch data between the first group of data pins and one of the first memory rank and the second memory rank dependent on the select signal, and
a second microbuffer to switch data between the second group of data pins and one of the first memory rank and the second memory rank dependent on the select signal.

7. The memory module of claim 1, wherein the switching logic comprises:
a central buffer to switch the data based on the select signal.

8. A method for operating a memory module comprising:
obtaining a first configuration control signal;
controlling, based on the first configuration control signal, a set of configurable switches to configure the memory module in a first configuration in which a first group of configurable switches are enabled to couple between a first group of data pins and switching logic and a second group of configurable switches are disabled to decouple a second group of data pins and the switching logic;
receiving a select signal to control switching between a first memory rank comprising at least a first memory device and a second memory rank comprising at least a second memory device; and
switching, by switching logic, data between the first group of data pins that are enabled and one of the first memory rank and the second memory rank dependent on the select signal.

9. The method of claim 8, further comprising:
receiving a second configuration control signal to reconfigure the memory module in a second configuration in which the second group of configurable switches are enabled to couple between the second group of data pins and the switching logic, and the first group of configurable switches are disabled to decouple the first group of data pins and the switching logic.

10. The method of claim 9, further comprising:
receiving a third configuration control signal to reconfigure the memory module in a third configuration in which the first group of configurable switches are enabled to couple between the first group of data pins and the switching logic, and the second group of configurable switches are enabled to couple between the second group of data pins and the switching logic.

11. The method of claim 8, wherein the obtaining the first configuration control signal comprises:
reading one or more mode registers of the memory module.

12. The method of claim 8, wherein the obtaining the first configuration control signal comprises:
receiving the first configuration control signal from a memory controller.

13. The method of claim 8, wherein the obtaining the first configuration control signal comprises:
receiving the first configuration control signal based on a manual switch of the memory module.

14. The method of claim 8, wherein switching the data between the first group of data pins and one of the first memory rank and the second memory rank is performed by a microbuffer of the memory module.

15. A memory module comprising:
configuration control means for obtaining a first configuration control signal and controlling, based on the first configuration control signal, a set of configurable switches to configure the memory module in a first configuration in which a first group of configurable switches are enabled to couple between a first group of data pins and switching logic, and a second group of configurable switches are disabled to decouple a second group of data pins and the switching logic;
selection means for receiving a select signal to control switching between a first memory rank comprising at least a first memory device and a second memory rank comprising at least a second memory device; and
switching means for switching data between the first group of data pins that are enabled and one of the first memory rank and the second memory rank dependent on the select signal.

16. The memory module of claim 15, wherein the configuration control means is further for receiving a second configuration control signal to reconfigure the memory module in a second configuration in which the second group of configurable switches are enabled to couple between the second group of data pins and the switching logic, and the first group of configurable switches are disabled to decouple the first group of data pins and the switching logic.

17. The memory module of claim 16, wherein the configuration control means is further for receiving a third configuration control signal to reconfigure the memory module in a third configuration in which the first group of configurable switches are enabled to couple between the first group of data pins and the switching logic, and the second group of configurable switches are enabled to couple between the second group of data pins and the switching logic.

18. The memory module of claim 15, wherein the configuration control means comprises:
storing means for storing one or more mode register values and outputting the mode register value in the first configuration control signal.

19. The memory module of claim 15, wherein the configuration control means comprises:
receiving means for receiving the first configuration control signal from a memory controller.

20. The memory module of claim 15, wherein the configuration control means comprises:
receiving means for receiving the first configuration control signal based on a manual switch of the memory module.

* * * * *